United States Patent [19]
Gunn et al.

[11] Patent Number: 5,395,134
[45] Date of Patent: Mar. 7, 1995

[54] PASSENGER SIDE AIR BAG WITH CONTROLLED DEPLOYMENT

[75] Inventors: Brian D. Gunn, Ogden; Marc D. Folsom, Salt Lake City; David J. Dyer, Kaysville, all of Utah

[73] Assignee: Morton International, Inc., Chicago, Ill.

[21] Appl. No.: 42,122

[22] Filed: Apr. 2, 1993

[51] Int. Cl.$^6$ .............................................. B60R 21/20
[52] U.S. Cl. .............................. 280/743 R; 280/743 A
[58] Field of Search ............... 280/728 R, 732, 743 R, 280/743 A, 736 R, 730 R

[56] References Cited

U.S. PATENT DOCUMENTS

| | | | |
|---|---|---|---|
| 3,476,402 | 11/1969 | Wilfert | 280/150 |
| 3,586,347 | 6/1971 | Carey et al. | 280/130 |
| 3,730,551 | 5/1973 | Sack et al. | 280/150 |
| 3,756,620 | 9/1973 | Radke | 280/150 |
| 3,797,855 | 3/1974 | Wright, Jr. | 280/150 |
| 3,810,654 | 5/1974 | DeBano, Jr. et al. | 280/150 |
| 3,831,972 | 8/1974 | Allgaier et al. | 280/730 R |
| 3,874,693 | 4/1975 | Patzelt et al. | 280/150 |
| 3,879,056 | 4/1975 | Kawashima et al. | 280/150 |
| 3,879,057 | 4/1975 | Kawashima et al. | 280/150 |
| 3,891,272 | 6/1975 | Takada | 297/386 |
| 3,938,824 | 2/1976 | Patzelt | 280/150 |
| 3,990,726 | 11/1976 | Oka et al. | 280/739 |
| 4,186,941 | 2/1980 | Scholz et al. | 280/743 |
| 4,213,634 | 7/1980 | Hoshino et al. | 280/743 |
| 4,805,930 | 2/1989 | Takada | 280/739 |
| 4,828,286 | 5/1989 | Fohl | 280/731 |
| 4,830,401 | 5/1989 | Honda | 280/736 |
| 4,842,300 | 6/1989 | Ziomek et al. | 280/732 |
| 4,988,118 | 1/1991 | Good et al. | 280/743 R |
| 5,022,675 | 6/1991 | Zelenak, Jr. et al. | 280/743 |
| 5,033,771 | 7/1991 | Miyauchi et al. | 280/728 |
| 5,044,663 | 9/1991 | Seizert | 280/730 |
| 5,048,863 | 9/1991 | Henseler et al. | 280/743 |
| 5,078,423 | 1/1992 | Fujita | 280/743 |
| 5,087,071 | 2/1992 | Wallner et al. | 280/743 |
| 5,094,477 | 3/1992 | Togawa | 280/743 |
| 5,205,584 | 4/1993 | Honda | 280/743 A |
| 5,249,825 | 10/1993 | Gordon et al. | 280/728 R X |

FOREIGN PATENT DOCUMENTS

| | | |
|---|---|---|
| 495409 | 7/1992 | European Pat. Off. |
| 2030863 | 12/1971 | Germany |
| 2944319 | 5/1981 | Germany |
| 0067748 | 3/1991 | Japan .............. 280/243 R |

OTHER PUBLICATIONS

English language Abstract of Japanese Patent Publication No. 3-136945, published Jun. 11, 1991.

Primary Examiner—Mitchell J. Hill
Assistant Examiner—Christopher P. Ellis
Attorney, Agent, or Firm—George W. Rauchfuss; Gerald K. White

[57] ABSTRACT

A passenger side air bag exhibits controlled deployment of a vertically elongated frontal surface prior to full inflation. The air bag includes a depending lobe extending downwardly from the inlet opening secured to an inflator module mounted in a dashboard. A portion of the front panel of the air bag is releasably secured, such as by breakaway stitching, to a portion of the rear of the depending lobe, below the inlet opening. Outward deployment of the air bag in an elongated column is prevented by the stitching, and a broad front surface develops early in the deployment and inflation process. The breakaway stitching releases part way through the deployment and inflation process, and the front surface then fills out to full inflation. Higher stitch density in the area of stitching which first releases contributes to controlled deployment.

47 Claims, 6 Drawing Sheets

FIG. 1
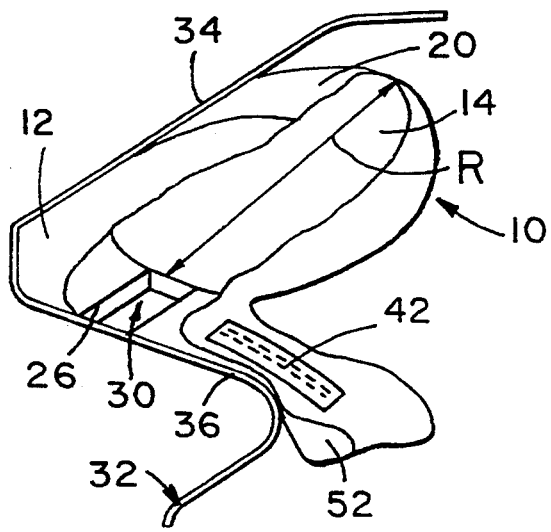
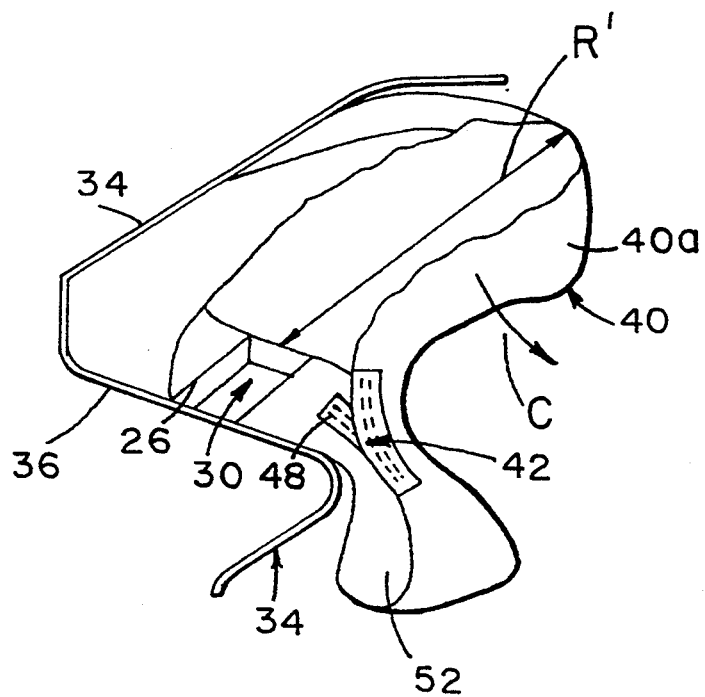
FIG. 2

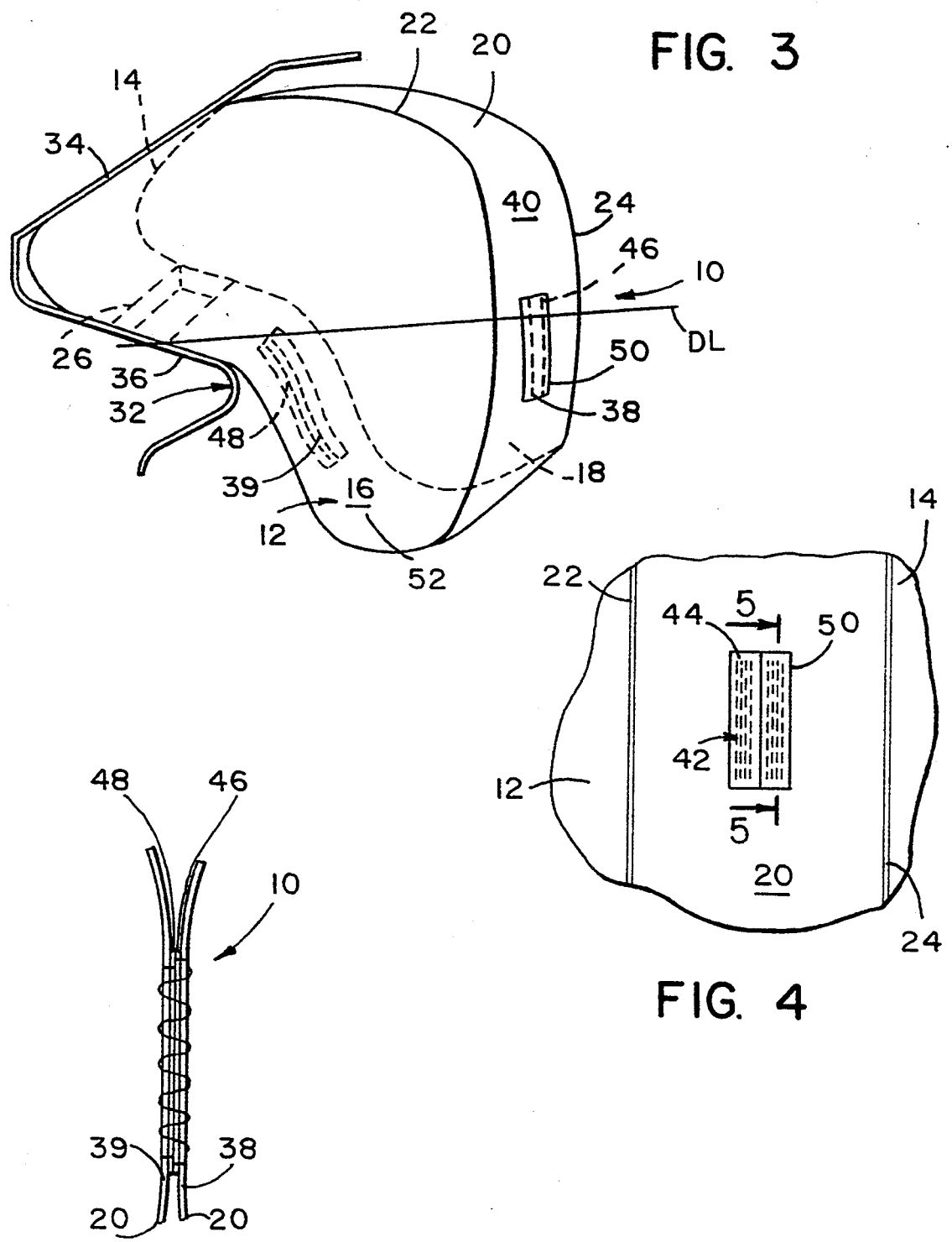

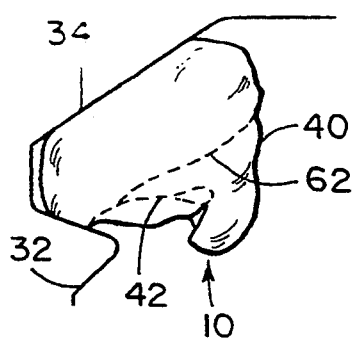
FIG. 12
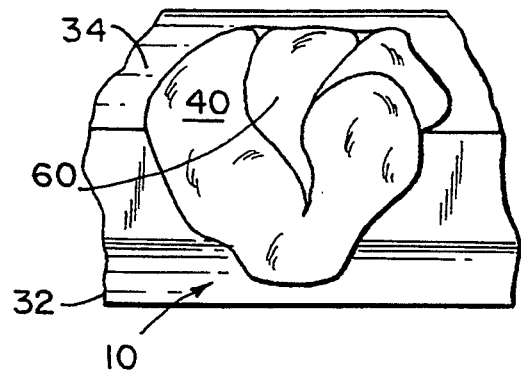
FIG. 13
FIG. 14
FIG. 15
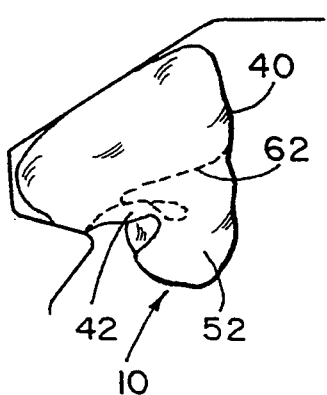
FIG. 16
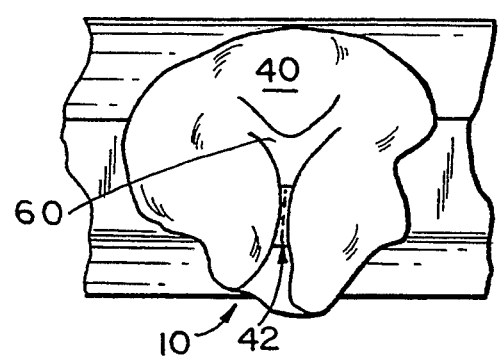
FIG. 17
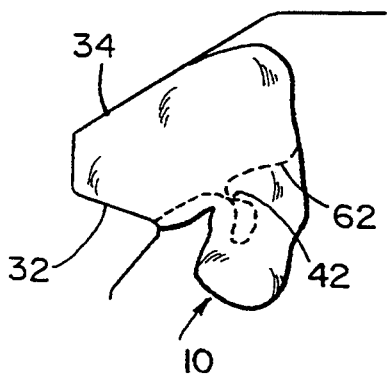
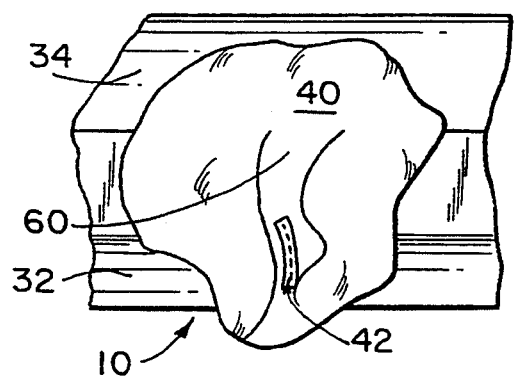

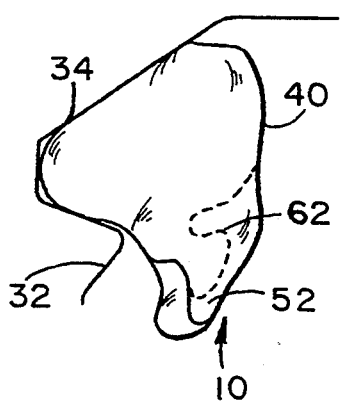
FIG. 18
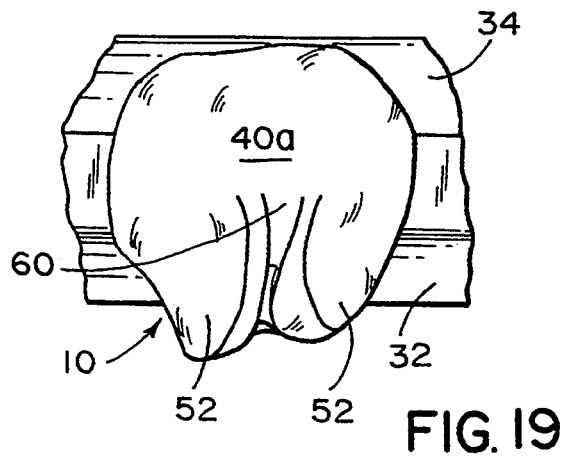
FIG. 19
FIG. 20
FIG. 21
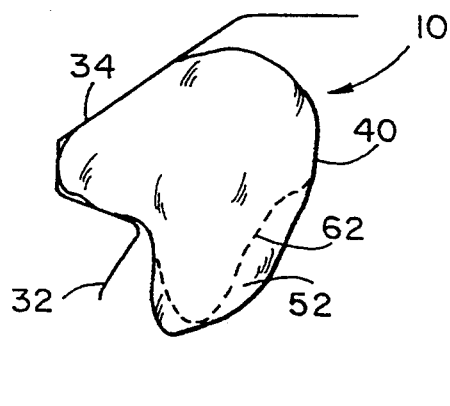
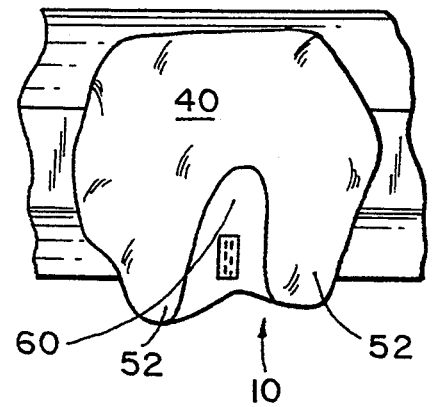
FIG. 22
FIG. 23
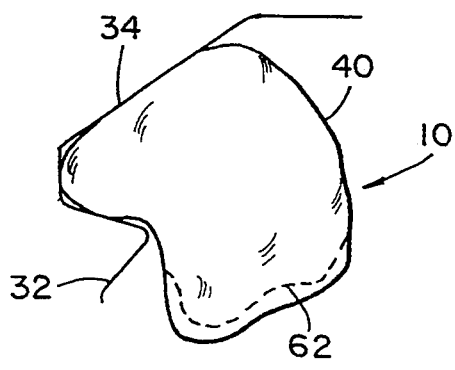
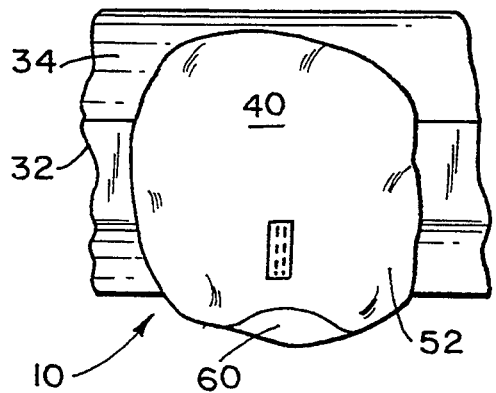

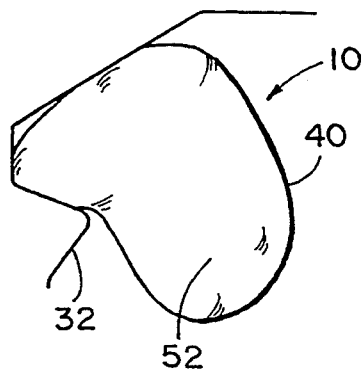
FIG. 24
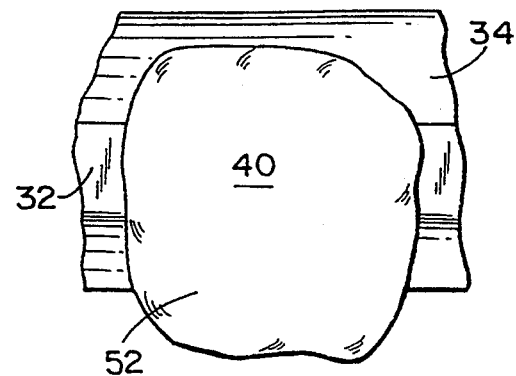
FIG. 25
FIG. 26
FIG. 27
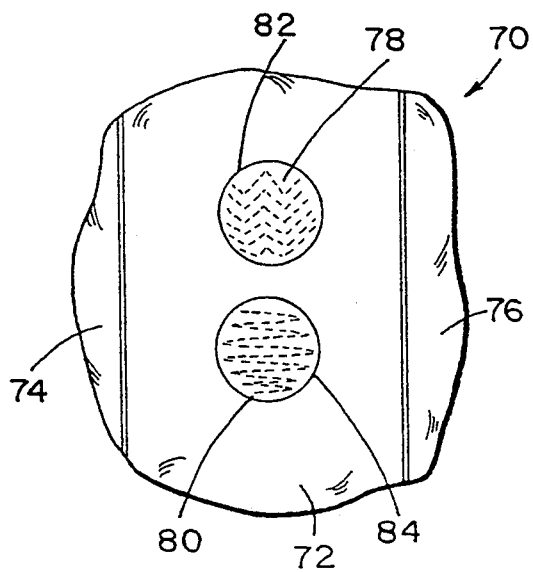
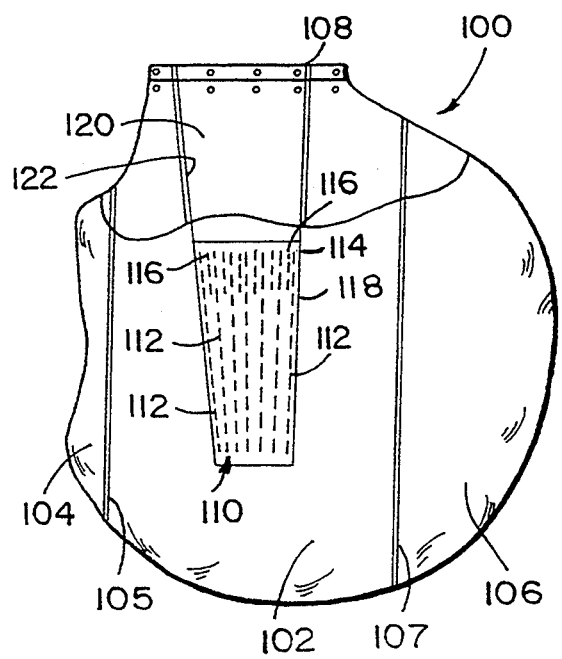

PASSENGER SIDE AIR BAG WITH CONTROLLED DEPLOYMENT

BACKGROUND OF INVENTION

1. Field of the Invention

The invention herein refers to a vehicle air bag and more particularly to a passenger's side vehicle air bag adapted to deploy in a controlled manner.

2. Prior Art

Many modern vehicles incorporate one or more inflatable air bags for the protection of occupants in the event of a crash. The air bags are mounted in a folded, compact condition in conjunction with a gas generator, and upon sensing of a vehicle crash, the gas generator produces inflation gas which rapidly deploys and inflates the air bag.

The passenger side air bag is typically mounted in the dashboard and deploys toward the passenger as the passenger experiences relative motion toward the windshield, dashboard and deploying air bag. The thrust or main axis of deployment of the air bag is directly toward the passenger, and the material of the air bag initially forms an elongated column, the end of which may strike the driver, sometimes in the face, occasionally resulting in abrasions. Additionally, if the passenger's head is decelerated by the air bag while the passenger's torso is moving forward, the passenger can experience a whip lash motion. A further consideration is for small passengers and children who, if they do not impede against the air bag as it initially deploys, may slip under it and be less than fully protected.

The foregoing difficulties are exacerbated in vehicles mounting the air bag on an upwardly angled dashboard surface, whereby initial deployment is more upward than outward toward the passenger's torso.

Accordingly, one design objective for passenger side air bags is to limit the extent of outward deployment prior to full inflation and to encourage a vertically elongated frontal surface in early deployment of the passenger side air bag.

It is known in the prior art to provide air bags with internal tether straps to restrain the range of initial deployment toward the passenger. Two to four anchored tether straps or webs have their ends secured to the front panel of the air bag to limit the extent of deployment of the front panel toward the passenger. The tether strap system, although efficient in limiting the extent of deployment, has some drawbacks of its own. The tether straps add concentrated points of mass to the front panel, and this additional mass in part increases the likelihood of possible abrasions in that more kinetic energy is developed and imparted to the passenger if the air bag reaches the passenger. The tether straps also cause stress concentration at the attachment points, thereby requiring additional reinforcement to prevent failure of the air bag. Further, the tether straps add bulk and weight to the air bag module when it is desirable to keep the module as light in compact as possible for mounting in the dash. The tether strap system also has little effect upon the direction of deployment of the air bag, and encourages formation of a vertically elongated front only after outward deployment to the extent of the tether straps has occurred.

Accordingly, there is need for better control in the deployment of a passenger's side air bag while retaining simplicity and reliability in the manufacturing and operation thereof.

SUMMARY OF THE INVENTION

An object of the invention herein is to provide a vehicle occupant restraint system including an improved air bag for protecting the occupant of a vehicle in a crash.

Another object of the invention is to provide an improved air bag which is particularly well adapted for mounting in the vehicle dashboard on the passenger side of the vehicle.

A further object of the invention is to provide an air bag which exhibits controlled deployment.

An additional object of the invention is to provide an air bag which forms a vertically elongated front surface prior to full inflation of the air bag.

It is another object of the invention to provide an air bag which exhibits controlled deployment with a minimum bulk and weight.

It is also an object of the invention to provide an air bag which exhibits ease of manufacture and reliability in operation.

In accomplishing these and other objects of the invention, there is provided a vehicle occupant restraint system including an air bag adapted to be deployed and inflated from a dashboard storage position and also including a gas generator for supplying inflation gas to an inlet opening of the air bag. When fully inflated, the air bag forms a vertically elongated front surface for extending to the passenger's lap area, the vertically elongated front surface being partially formed by a lobe depending below the dashboard from the inlet opening, the depending lobe also having a rear surface extending toward the inlet opening. A portion of the air bag defining front surface is releasably secured to a portion of the air bag defining the rear surface of the depending lobe. According to one aspect of the invention, the secured front portion is also part of the depending lobe. Upon initial deployment and partial inflation of the air bag, outward deployment of the upper portion of the vertically elongated front surface is limited because of the front surface attachment to the rear of the depending lobe. Thereafter the releasable securement separates and the lower portion of the vertically elongated front surface forms. This provides formation of the vertically elongated front surface of the air bag relatively early in the deployment and inflation process, which then proceeds with the air bag shaped in a desired configuration.

According to another aspect of the invention, the portions of the front of the air bag and the rear of the depending lobe releasably secured together permit passage of initial inflation gas to the depending lobe prior to separation of the releasable securement so that the lower portion of the air bag deploys and partially inflates.

According to a further aspect of the invention, the front panel and rear panel of the depending lobe are secured together by breakaway stitching. More aspects of the invention are in providing reinforcement patches within which the stitching is deployed, and in providing the stitching in parallel vertical lines.

A particular aspect of the invention is in providing a stitch density in the area of stitching which first separates which is higher than the stitch density in the area of stitching which subsequently separates. The stitching is advantageously provided in elongated converging lines, with greater lateral spacing in the area of first separation and with additional short stitch line segments interspersed between the elongated lines in the area of first separation to provide the higher stitch density.

According to another aspect of the invention, the air bag comprises a central panel and two substantially identical side panels each having a depending lobe, each side panel having its marginal edge secured to a respective edge of the central panel to provide an air bag defining an inlet opening, the central panel extending from the inlet opening along the top edges of the side panels to the front edges of the side panels, along the front edges of the side panels, including the front edges of the depending lobes of the side panels, thereby providing a frontal surface of the air bag, and along the rear edges of the depending lobes of the side panels and to the inlet opening. In connection with this aspect of the invention, a portion of the central panel between the front edges of the lobes is releasably secured to a portion of the central panel between the rear edges of the lobes. More particularly, the secured portions are less than one-half the width of the front panel and rear panel of the depending lobe.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

DRAWINGS

FIG. 1 illustrates a passenger side air bag according to the invention herein shown schematically in an early stage of deployment from the dashboard of a vehicle;

FIG. 2 illustrates the air bag of FIG. 1 shown schematically in an intermediate stage of deployment and inflation;

FIG. 3 illustrates the air bag of FIG. 1 shown schematically fully deployed and inflated;

FIG. 4 is a fragmentary front elevation view of the air bag of FIG. 1;

FIG. 5 is a sectional view of the air bag of FIG. 1, taken along the lines 5—5 of FIG. 4;

FIG. 12 is a side elevation view of the air bag of FIG. 1 in a later stage of deployment and inflation;

FIG. 13 is a front elevation view of the air bag of FIG. 1 in the same stage of deployment and inflation as shown in FIG. 12;

FIG. 14 is a side elevation view of the air bag of FIG. 1 in a later stage of deployment and inflation;

FIG. 15 is a front elevation view of the air bag of FIG. 1 in the same stage of deployment and inflation as shown in FIG. 14;

FIG. 16 is a side elevation view of the air bag of FIG. 1 in a later stage of deployment and inflation;

FIG. 17 is a front elevation view of the air bag of FIG. 1 in the same stage of deployment and inflation as shown in FIG. 16;

FIG. 18 is a side elevation view of the air bag of FIG. 1 in a later stage of deployment and inflation;

FIG. 19 is a front elevation view of the air bag of FIG. 1 in the same stage of deployment and inflation as shown in FIG. 18;

FIG. 20 is a side elevation view of the air bag of FIG. 1 in a later stage of deployment and inflation;

FIG. 21 is a front elevation view of the air bag of FIG. 1 in the same stage of deployment and inflation as shown in FIG. 20;

FIG. 22 is a side elevation view of the air bag of FIG. 1 in a later stage of deployment and inflation;

FIG. 23 is a front elevation view of the air bag of FIG. 1 in the same stage of deployment and inflation as shown in FIG. 22;

FIG. 24 is a side elevation view of the air bag of FIG. 1 in a later stage of deployment and inflation;

FIG. 25 is a front elevation view of the air bag of FIG. 1 in the same stage of deployment and inflation as shown in FIG. 24;

FIG. 26 is a fragmentary front elevation view of another air bag according to the invention herein; and FIG. 27 is a fragmentary front elevation view of another air bag according to the invention herein.

The same reference numerals refer to the same elements throughout the various figures.

DESCRIPTION OF PREFERRED EMBODIMENTS

Figure 6:
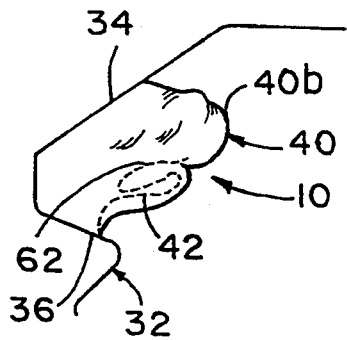
FIG. 6 is a side elevation view of the air bag of FIG. 1 in an early stage of deployment and inflation.

FIGS. 1-5 depict an air bag 10 according to the invention herein. The air bag 10 is well suited for use on the passenger side of the vehicle, and is designed for controlled deployment and inflation in which a vertically elongated frontal surface is achieved relatively early in the deployment and inflation process. Such deployment is achieved even from a "top mount" position, i.e., in a dashboard angled upwardly.

Also schematically shown in FIGS. 1-3 (and other figures as well) are the dashboard 32 and windshield 34 of a vehicle in which the air bag 10 is used. The dashboard 32 is of the type having a top panel 36 angled to face substantially upwardly toward the windshield 34, with the inflator module and storage compartment 30 being mounted in the top panel 36. This is referred to as a "top mount" air bag installation.

With particular reference to FIG. 3, in which the air bag 10 is illustrated fully deployed and inflated, the air bag 10 comprises substantially identically shaped side panels 12 and 14, side panel 14 being shown in dotted lines. The side panels 12 and 14 include depending lobe portions 16 and 18, respectively. The air bag 10 further comprises a central panel 20 secured to the side panels 12 and 14 at seams 22 and 24, respectively. The air bag 10 defines an inlet opening at 26, where the air bag 10 is connected to an inflator module and storage compartment 30, as is well known in the art and is therefore shown only schematically in the drawings. The depending lobe portions 16, 18 of the side panels extend downwardly from the inlet opening and are below the line DL in FIG. 3.

With continued reference to FIG. 3, when the air bag 10 is fully deployed and inflated, the central panel 20 extends from the inlet opening 26 along the top edges of the side panels 12 and 14, a portion of which lie near or against the windshield 34. The central panel 20 also extends along a vertically elongated front surface 40 of the air bag 10, which is in part defined between the depending lobes 16 and 18 of the side panels 12 and 14. The central panel 20 continues along the rear edges of the depending lobes to return to the inlet opening 26. The fabric for the side panels and central panel is 49×49 nylon, and the air bag 10 as heretofore described is substantially the same as is known in the prior art and accordingly may be fabricated readily by one skilled in the art.

The air bag 10 is further characterized by a releasable securement of a portion 38 of the central panel 40 between the front edges of the depending lobes of the side panels with a portion 39 of the central panel 40 between the rear edges of the depending lobes of the side panels. In air bag 10 this is accomplished by breakaway stitching 42 applied to a reinforced portion of the central panel. As best seen in FIG. 4, the stitching 42 is provided in eight parallel lines aligned with the seams 22 and 24 joining the central panel 20 with the side panels 12 and 14. The ends 44 of the stitching 42 nearest the inlet opening prior to release of the stitching are back stitched to resist initially and thereby delay separation of the joined portions of the front panel 20. Each of the eight stitch lines is nine inches long, and the stitches are applied with 90 pound nylon thread at approximately eight stitches per inch.

With reference to FIG. 5, the central panel 20 is reinforced in the area of the stitching by two patches 46 and 48. Patch 46 is secured to the portion 38 of the front panel which is part of the vertically elongated frontal surface 40, and reinforcing patch 48 is secured to the portion 39 of the front panel 20 which is part of the rear of the depending lobe. The reinforcing patches are rectangular and are secured to the front panel by stitching 50.

The stitching 42 connects only a central portion of the central panel 20 together, and inflation gas is free to pass on either side of the stitching 42 into the depending lobe region of the air bag 10 during early deployment and inflation of the air bag 10.

It will be appreciated that the pattern of stitching, the amount of stitching, the strength of the thread used to apply the stitches and the number of stitches per inch may be varied to achieve the desired operating parameters of an air bag in a particular installation with its specific requirements. Thus, although the disclosure of the specific stitching set forth above is applicable to the air bag 10 comprising the preferred embodiment of the invention and achieve desired operational results, as more fully discussed below, the invention herein is not limited to that particular specific stitching.

With reference to FIGS. 1-3, the deployment and inflation of the air bag 10 is illustrated schematically. With reference to FIG. 1, the air bag 10 is in a relatively early stage of deployment and inflation. Prior thereto, the air bag was folded for storage in the inflation module 30 mounted under a breakaway portion of the dashboard panel 36. The inflation module 30 includes a gas generator (not shown) which is activated upon sensing of a collision to produce inflation gas rapidly. Filling and expansion of the air bag 10 opens the breakaway portion of the dashboard and the air bag 10 is freed to deploy and inflate. The inflator module 30, the breakaway dashboard and the initial operation of the inflator module and air bag are well known to those skilled in the art, and accordingly are not shown and described in greater detail herein. The invention herein relates more particularly to the shaping of the air bag 10 by the releasable securement during deployment and inflation after the inflation process has begun.

With continued reference to FIG. 1, the air bag 10 deploys upwardly along the windshield 34 and outwardly toward the passenger, not shown. The upward and outward deployment is in part a function of the top mount of the inflator module in panel 36 of dashboard 32, wherein a column of inflation gas is directed substantially upwardly and outwardly, rather than outwardly alone. However, the outward deployment of the air bag 10 is inhibited by the stitching 42, which limits the amount of the central panel 20 which is available for outward extension. The extension is illustrated in FIG. 1 by the line R, and it can be seen that the stitching 42 limits the amount of the center panel 20 available for extension.

Because the outward deployment of the air bag 10 is limited, lateral expansion of the air bag 10 is encouraged, i.e., the column of inflation gas is deflected and diverted laterally. Further, inflation gas also flows past the stitches 42, on either side thereof, and begins inflation of the lower portion of the depending lobe of air bag 10, indicated at 52 in FIG. 1.

With reference to FIG. 2, the deployment and inflation of air bag 10 has continued, characterized by partial separation of stitches 42. The separation occurs primarily because of the forward momentum and kinetic energy of the air bag material. When the air bag 10 has deployed to the limit created by the stitching, the kinetic energy developed by the deploying air bag material in effect "jerks" the stitching and causes the stitching to separate. Thus, the separation is not caused by pressure of inflation gases within the bag, but instead by the deployment process.

Because of the restraint provided by stitching 42, the inflation gases tend to fill out the air bag 10 rather than to drive the air bag 10 in an elongated column. Thus, the air bag 10 begins to develop a vertically elongated frontal surface 40 relatively early in the deployment and inflation process, with a downwardly forming portion of the vertically elongated frontal surface 40 being indicated at 40a in FIG. 2. The line R' is shown in FIG. 2 to indicate the direction and extent of furthest deployment of the air bag. With respect to the line R in FIG. 1, the line R' is only marginally larger despite continuing inflation, and is rotated downwardly. The cured arrow C in FIG. 2 indicates the progression of the formation of the elongated frontal surface 40 and the air bag 10 exhibits this deployment rather than further outward deployment along the line R'. The bottom portion 52 of the depending lobe of air bag 10 has also achieved greater inflation.

With reference to FIG. 3, the air bag 10 is shown schematically fully deployed. The stitching 42 is fully separated, leaving the patches 46 and 48 also separated and attached to the respective portions 38, 39 of the deployed depending lobe 52. The vertically elongated frontal surface 40 extends downwardly below the dashboard 32, such that it receives the passenger over its entire length and, in particular, provides a vertical surface for protecting a short passenger or child.

FIGS. 6–25 illustrate sequential deployment and inflation of the air bag 10, as viewed from the side in the even numbered figures and from the front in the odd numbered figures. The FIGS. 6–25 were developed from time-sequence photographs of the deployment and inflation of the air bag 10.

Figure 7:
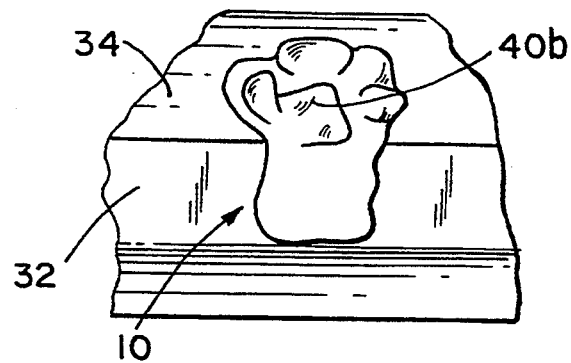
FIG. 7 is a front elevation view of the air bag of FIG. 1 in the same stage of deployment and inflation as shown in FIG. 6.

FIGS. 6 and 7 illustrate the air bag 10 14 milliseconds after the inflator module was activated to produce inflation gas. The air bag 10 has burst through the panel 36 of dashboard 32, deployed upwardly along the window 34 and an upper portion 40b of the frontal surface 40 has begun deploying toward the passenger occupant position, at a height substantially above the dashboard 32. The upper portion of the bag, in the vicinity of 40b, has also begun lateral expansion to provide a broad frontal surface. At this point, the bag material is relatively slack, and the exterior surface is somewhat bumpy, as the material is unevenly filled. This is also seen by the dotted line 62 which represents a vertical center line of the front panel material, stitched at 42.

Figure 8:
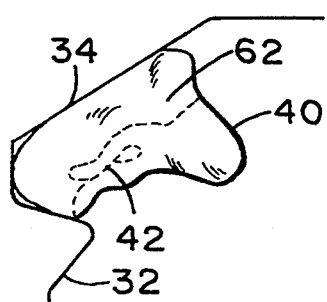
FIG. 8 is a side elevation view of the air bag of FIG. 1 in a later stage of deployment and inflation.
Figure 9:
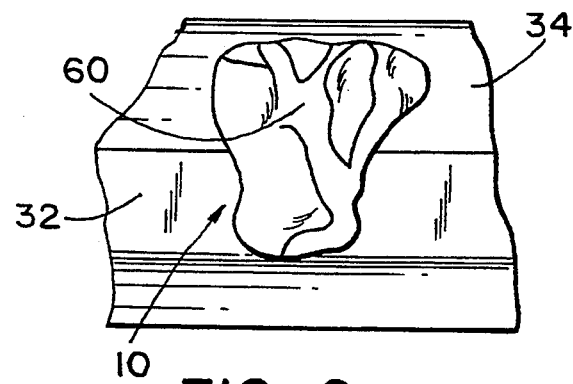
FIG. 9 is a front elevation view of the air bag of FIG. 1 in the same stage of deployment and inflation as shown in FIG. 8.

FIGS. 8 and 9 illustrate deployment and inflation of the air bag at 16 milliseconds into the process. The frontal surface 40 has expanded downwardly, and is best seen in FIG. 8, and has also expanded laterally, as best seen in FIG. 9. With reference to FIG. 9, a trough has begun to form in the central part of the frontal surface, as indicated at 60, and relatively lumpy filling bubbles of slack material expand outwardly on either side of the trough 60. In FIG. 8, there is also shown schematically the believed location of the stitching 42 and, in dotted line 62, the fabric extending from the stitching along the center line of the bag. The bag is still only partially inflated, and contact with a passenger would not be expected at this point.

Figure 10:
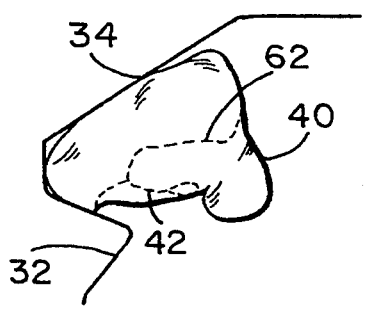
FIG. 10 is a side elevation view of the air bag of FIG. 1 in a later stage of deployment and inflation.
Figure 11:
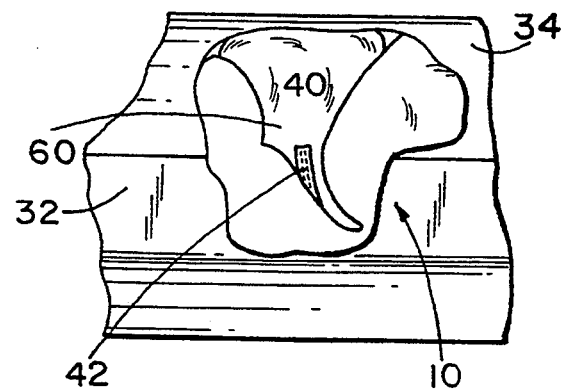
FIG. 11 is a front elevation view of the air bag of FIG. 1 in the same stage of deployment and inflation as shown in FIG. 10.

With reference to FIGS. 10 and 11, the deployment and inflation is shown at 18 milliseconds after triggering of the inflation module. The frontal surface 40 continues to expand downwardly, and the center line material 62 becomes more taut. The trough 60 begins to open as the frontal surface 40 emerges, and the stitching 42 appears in the trough. Also, lateral expansion of the air bag 10 continues, along with the vertical expansion, in contrast to the air bag forming in an outwardly extending column.

FIGS. 12 and 13 illustrate the extent of deployment at 21 milliseconds into the inflation process. The frontal surface 40 continues to expand downwardly, and lateral expansion continues as well. The center line material shown dotted line 62 is substantially taut, and the trough 60 becomes somewhat deeper as the material on either side of the taut center line material expands to the sides. However, the surfaces are still somewhat lumpy, because although a volume of inflation gas is present, inflation pressure has not built up inside the air bag 10.

FIGS. 14 and 15 illustrate the air bag at 23 milliseconds after triggering of the inflation module. At this point, a further elongated frontal surface 40 is forming, and a depending lobe portion of the bag is also becoming more prominent at 52. The center line material 62 has become taut and "jerked" by the outwardly deploying bag, and the stitching 42 is partially broken away. With reference to FIG. 15, the trough 60 has become localized, narrow and deep, indicating the retarding effect on the deployment of the centermost portion of the bag. Nevertheless, the bag has formed substantial lateral and vertical dimensions, again without excessive outward deployment.

FIGS. 16 and 17 illustrate the deployment and inflation of the air bag at 25 milliseconds after triggering. At this point, it appears that the stitches 42 are tearing away, and more of the center line material 62 is free to deploy outwardly and fill in the front surface 40 of the air bag 10. This is also seen in FIG. 17, wherein the upper end of trough 60 is relaxed as the central panel material is released to come forward. The release also contributes to lateral expansion of the air bag 10. At this point, depending upon the speed of the vehicle at the time of a crash and the rate of deceleration, contact with a passenger is possible. However, the air bag 10 is deployed with a good lateral and vertical dimension and is sufficiently inflated—with inflation continuing—to provide protection.

FIGS. 18 and 19 illustrate deployment and inflation of the air bag 10 at 27 milliseconds after triggering of the inflation module. The stitching 42 is now fully broken away, and the center panel is free to deploy outwardly. The upper portion 40a of the frontal surface 40 is enlarged vertically, and the material forming the trough 60 has relaxed and deployed forwardly. The depending lobe 52 also extends further downwardly, enlarging the vertical extent of the air bag. The dotted line 62 of the central material is shown assuming a more planer frontal surface, in effect catching up with the material on either side thereof.

With reference to FIGS. 20 and 21, the deployment and inflation process is shown at 30 milliseconds into the process. The air bag 10 has achieved additional volume, pursuant to the time of operation of the gas generator, and the air bag 10 assumes a more planer front surface 40 and an increasingly enlarged depending lobe 52. The material in the vicinity of the trough 60 is substantially flattened, and is moving forward.

With reference to FIGS. 22 and 23, the air bag 10 is shown at 33 milliseconds after triggering of the inflation module. The front surface 40 has become more vertically elongated, and in particular has deployed outwardly toward the passenger opposite the dashboard 32. The trough 60 has substantially smoothed out, and the air bag 10 has assumed a rounded configuration.

FIGS. 24 and 25 illustrate the air bag 10 36 milliseconds after triggering of the inflation module, at which time the air bag is substantially fully inflated. The air bag 10 has developed a vertically elongated front surface 40 and a depending lobe which extends well below the center of dashboard 32 and the inflater module mounted therein. The depending lobe 52 essentially fills the lap of the passenger so that the passenger's energy is spread over the largest possible surface of the air bag and passenger restraint and cushioning is maximized. In FIGS. 24 and 25, the material in the vicinity of the stitching 42 has fully deployed to the outermost surface of the air bag 10.

In viewing FIGS. 6–25 together, they illustrate a controlled deployment and shaping of the air bag 10, wherein the air bag 10 does not form a column and extend outwardly beyond the final fully inflated position of FIGS. 24 and 25. Instead, the air bag 10 deploys outwardly to a limited extent and then develops a vertically elongated frontal surface and depending lobe as the air bag fills and becomes fully inflated and rounded. The rapid downward deployment of the vertical surface is very useful for passenger protection, in that the air bag is better positioned to receive not only the head but the upper torso of the passenger and to receive smaller passengers, including children.

As noted in the deployment and inflation of air bag 10 shown in FIGS. 6-25, the formation of the frontal surface rotates downwardly as the stitching limits the deployment of the central panel, thus encouraging the air bag to take its deployed shape and position in front of the passenger early in the inflation process. However, there are several other variables which affect the deployment. These include the time delay between the onset of a crash and triggering of the gas generator, the response and output of the gas generator, the location and orientation of the inflator module including the folded bag on the dashboard, and the dimensions of the vehicle. Desired operation can nevertheless be achieved by varying the location of the stitches, the stitch pattern, the number of stitches and the strength of the thread used for the stitches. Similarly, the air bag can be constructed of panels of different configurations, without altering the benefits achieved from releasably securing the front panel to the rear panel below the inlet opening.

In this regard, an air bag 70 is shown in fragmentary view in FIG. 26, the air bag 70 having a central panel 72 and side panels 74 and 76. Stitching 78 and 80 is applied to releasably secure the central panel 72 to itself below the inlet opening in a depending lobe portion of bag 70. Stitches 78 are applied in nested "W" pattern within a circle 82, the circle 82 constituting fine stitches sewing a circular reinforcement patch under the central panel 72. Stitching 80 is applied in a zigzag pattern, also within circular stitching 84 securing a circular reinforcing patch to the back of front panel 72.

Another air bag 100 according to the invention herein is shown in fragmentary view, partially cut away, in FIG. 27. Air bag 100 comprises a central panel 102 and side panels 104 and 106, connected at seams 105 and 107, and has the general shape, including a depending lobe, of air bag 10. A collar portion 108 of the air bag 100 defining its inlet opening includes a folded, stitched hem and openings for attaching the air bag to an inflator module, not shown.

Stitching generally indicated at 110 releasably secures the front panel 102 to itself, below the inlet opening. The stitching is provided in seven vertically elongated converging stitch lines 112, which have their greater spacing at the end portion closer to the inlet opening, indicated at 114 in FIG. 27. The stitches at end 114 of the stitch lines 112 are the first to release during the deployment and inflation process. The converging pattern of stitch lines 112 provides both a greater width of stitching at the area of first release and imparts non-parallel force vectors to the air bag material, to resist formation of stress risers that could result in fabric failure.

The stitch density at end 114 of the stitching 110 is increased by application of stitch line segments 116 interspersed between the stitch lines 112. Six such stitch line segments are provided in the embodiment shown, the stitch line segments also have more stitches per unit length than the stitch lines 112. Thus, "stitch density" as used herein means a greater number of stitches in a given area, whether achieved by application of more stitch lines, utilization of more stitches per unit length, or both. In the air bag 100, the stitch lines 112 are approximately ten inches long with 5-7 stitches per inch, and the stitch line segments are approximately one inch long with 8-10 stitches per inch. Ninety pound nylon thread is used for the stitches.

The air bag 100 is reinforced in the area of the breakaway stitches 110. A first reinforcing patch is sewn to the inside of the front surface of central panel 102 by stitching 118 and although the patch is not seen, it is outlined by stitching 118. A second reinforcing patch 120 is sewn by stitching 122 to the inside of central panel comprising the rear of the depending lobe. Reinforcing patch 120 extends to the collar 108, thus provides a reinforced connection of the area of breakaway stitching with a mounting collar at the inflator module.

The additional stitch density at the area of stitching which first releases resists premature separation of the releasably secured portions of the air bag, and insures downward rotation of the forming vertically elongated frontal surface before release of the lower frontal surface.

The air bags 10, 70 and 100 shown and described herein are but some representations of possible stitch patterns and shapes and deployments of reinforcing patches. Although the invention contemplates locating the releasable stitching on the central panel of an air bag below the inlet opening, i.e., in the depending lobe area, alternate positions within that general vicinity may also be utilized to optimize performance for a given set of parameters.

Accordingly, preferred embodiments of vehicle air bags have been described which admirably achieve the objects of the invention herein. With reference to the description of the preferred embodiment, those skilled in the art will appreciate that modifications may be made without departing from the spirit of the invention. Therefore, it is not intended that the scope of the invention be limited to the specific embodiment illustrated and described. Rather, it is intended that the scope of the invention be determined by the appended claims and equivalents thereof.

We claim:

1. A vehicle occupant restraint system for mounting in a vehicle dashboard in front of a passenger position, the restraint system comprising:
   A) an air bag defining an inlet opening and which, when inflated, provides a vertically elongated front surface;
   B) the air bag, when inflated, including a depending lobe extending downwardly with respect to the vehicle dashboard, a front surface of the depending lobe forming a portion of the vertically elongated front surface of the air bag, and a rear surface of the depending lobe extending from the inlet opening to the bottom of the depending lobe;
   C) means releasably connecting and securing an inside of a portion of the air bag defining the vertically elongated front surface in contact with the inside of a portion of the air bag defining the rear surface of the depending lobe; and
   D) means connected to the air bag at the inlet opening for providing inflation gas;
   whereby the releasably securing means limits outward deployment of the vertically elongated front surface of the air bag during initial inflation of the air bag and releases upon partial deployment and inflation of the air bag.

2. A vehicle occupant restraint system as defined in claim 1 wherein the portions of the air bag releasably secured together are centered with respect to the width of the air bag.

3. A vehicle occupant restraint system as defined in claim 2 wherein the inside of the portion of the air bag defining the front surface which is releasably secured in contact with the inside of the portion of the air bag defining the rear surface of the depending lobe comprises a portion of the air bag defining the front surface of the depending lobe, and the releasably securing means initially releases adjacent the inlet opening of the air bag and the connected portions of the air bag thereafter separate from adjacent the inlet opening toward the bottom of the depending lobe.

4. A vehicle occupant restraint system as defined in claim 3 wherein the connected portions of the air bag permit inflation gas to flow to the depending lobe prior to release of the releasably securing means.

5. A vehicle occupant restraint system as defined in claim 4 wherein the releasably securing means comprises breakaway stitching.

6. A vehicle occupant restraint system as defined in claim 5 wherein the stitch density in an area of stitching which first releases is higher than the stitch density in an area which subsequently releases.

7. A vehicle occupant restraint system as defined in claim 6 wherein the breakaway stitching is applied in multiple stitch lines.

8. A vehicle occupant restraint system as defined in claim 7 wherein the multiple stitch lines are generally vertically oriented.

9. A vehicle occupant restraint system as defined in claim 8 wherein the stitch lines are provided in elongated converging lines with greater lateral spacing between the lines in the area of stitching which first releases.

10. A vehicle occupant restraint system as defined in claim 9 wherein the stitch density in the area of stitching which first releases is increased by additional stitch line segments interspersed between the greater laterally spaced end portions of the elongated converging stitch lines.

11. A vehicle occupant restraint system as defined in claim 10 wherein the stitches in the additional stitch line segments are applied at a higher count per unit length than the stitches in the elongated converging lines.

12. A vehicle occupant restraint system as defined in claim 5 wherein the air bag is reinforced in the portions connected by the breakaway stitching.

13. A vehicle occupant restraint system as defined in claim 12 wherein the air bag is reinforced by patches of material positioned between the connected portions of the air bag, the patches providing contact between the inside of the front surface and the inside of the rear surface of the depending lobe prior to separation thereof during inflation of the air bag.

14. A vehicle occupant restraint system as defined in claim 13 wherein the stitch density in the area of stitching which first releases is higher than the stitch density in the area which subsequently releases.

15. A vehicle occupant restraint system as defined in claim 13 wherein a patch of reinforcing material is secured to inside of the portion of the air bag defining the rear surface of the depending lobe and extends to and is secured at the inlet opening.

16. A vehicle occupant restraint system as defined in claim 12 wherein the breakaway stitching is applied in multiple stitch lines.

17. A vehicle occupant restraint system as defined in claim 16 wherein the multiple stitch lines are generally vertically oriented.

18. A vehicle occupant restraint system as defined in claim 17 wherein the multiple stitch lines comprise eight parallel vertically oriented stitch lines applied with elongated substantially rectangular reinforcing patches positioned between the connected portions of the air bag.

19. A vehicle occupant restraint system as defined in claim 17 wherein the stitch lines are provided in elongated converging lines with greater lateral spacing between the lines in the area of stitching which first releases.

20. A vehicle occupant restraint system as defined in claim 19 wherein the stitch density in the area of stitching which first releases is increased by additional stitch line segments interspersed between the greater laterally spaced end portions of the elongated converging stitch lines.

21. A vehicle occupant restraint system as defined in claim 20 wherein the multiple elongated converging stitch lines comprise seven stitch lines and the additional stitch line segments comprise six stitch line segments.

22. A vehicle occupant restraint system as defined in claim 21 wherein the stitch line segments have stitches applied at 8–10 stitches per inch and the elongated converging stitch lines have stitches applied at 5–7 stitches per inch.

23. A vehicle occupant restraint system as defined in claim 1 wherein the stitch density in the area of stitching which first releases is higher than the stitch density in the area which subsequently releases.

24. A vehicle occupant restraint system as defined in claim 1 wherein the inside of a portion of the air bag defining the front surface which is releasably secured to the inside of a portion of the air bag defining the rear surface of the depending lobe comprises a portion of the air bag defining the front surface of the depending lobe.

25. A vehicle occupant restraint system as defined in claim 1 wherein the connected portions of the air bag permit inflation gas to flow to the bottom of the depending lobe prior to release of the releasably securing means.

26. A vehicle occupant restraint system as defined in claim 1 wherein the releasably securing means comprises breakaway stitching.

27. A vehicle occupant restraint system as defined in claim 26 wherein the breakaway stitching is applied in multiple stitch lines.

28. A vehicle occupant restraint system as defined in claim 1 wherein the releasably securing means are applied at spaced-apart portions of the air bag.

29. An air bag for the passenger side of a vehicle, the air bag adapted to be deployed and inflated from a dashboard storage position including a gas generator, the air bag comprising:
  A) a central panel;
  B) two substantially identical side panels each having a depending lobe which, when the air bag is inflated, extends downwardly with respect to the vehicle dashboard;.
  C) each side panel having a marginal edge secured to a respective marginal edge of the central panel to define the air bag with an inlet opening;
  D) the central panel extending from the inlet opening along top edges of the side panels to front edges of the side panels, along the front edges of the side panels, including front edges of the depending lobes of the side panels thereby providing a vertically elongated frontal surface of the air bag, and along rear edges of the depending lobes to the inlet opening; and E) a portion of the central panel between the front edge of the depending lobes of the side panels releasably secured in connection with a portion of the central panel between the rear edges of the depending lobes of the side panels.

30. An air bag as defined in claim 29 wherein the portions of the central panel releasably secured together are centered with respect to the width of the central panel.

31. An air bag as defined in claim 30 wherein the connected portions of the central panel permit inflation gas to flow to the depending lobe prior to release of the releasably securing means.

32. An air bag as defined in claim 31 wherein the releasably securing means comprises breakaway stitching.

33. An air bag as defined in claim 32 wherein the breakaway stitching is applied in multiple stitch lines.

34. An air bag as defined in claim 33 wherein the density of stitches which first releases is greater than the density of the stitches which subsequently release.

35. An air bag as defined in claim 32 wherein the central panel is reinforced in the portions connected by the breakaway stitching.

36. An air bag as defined in claim 35 wherein the central panel is reinforced by patches of material positioned and providing contact.

37. An air bag as defined in claim 36 wherein one of the reinforcing patches is secured to the portion of the central panel between the rear edges of the depending lobe of the side panels and that reinforcing patch extends to the inlet opening.

38. An air bag as defined in claim 35 wherein the breakaway stitching is applied in multiple stitch lines.

39. An air bag as defined in claim 35 wherein the multiple stitch lines are generally vertically oriented.

40. An air bag as defined in claim 39 wherein the multiple stitch lines comprise eight parallel vertically oriented stitch lines applied with elongated substantially rectangular reinforcing patches positioned between the connected portions of the central panel.

41. An air bag as defined in claim 39 wherein the stitch lines are multiple elongated converging stitch lines with greater lateral spacing between the portions of the stitch lines which first release.

42. An air bag as defined in claim 41 wherein the stitch density of the stitches which first release is increased by application of stitch line segments between the elongated stitch lines.

43. An air bag as defined in claim 29 wherein the portion of the central panel defining the front surface of the air bag which is releasably secured to the inside of a portion of the air bag defining the rear surface of the depending lobe comprises a portion of the central panel defining the front surface above the depending lobe.

44. An air bag as defined in claim 27 wherein the connected portions of the air bag permit inflation gas to flow to the bottom of the depending lobe prior to release of the releasably securing means.

45. A vehicle occupant restraint system as defined in claim 29 wherein the releasably securing means comprises breakaway stitching.

46. An air bag as defined in claim 45 wherein the breakaway stitching is applied in multiple stitch lines.

47. An air bag as defined in claim 29 wherein the releasably securing means are applied at spaced-apart portions of the central panel.

* * * * *